(12) United States Patent
Roques et al.

(10) Patent No.: US 11,729,216 B1
(45) Date of Patent: Aug. 15, 2023

(54) MESSAGING LAYER SECURITY (MLS) DELIVERY SERVICE FOR REAL-TIME GROUP CONFIDENTIALITY USING HYBRID INFORMATION-CENTRIC NETWORKING (HICN)

(71) Applicant: Cisco Technology, Inc., San Jose, CA (US)

(72) Inventors: Olivier Roques, Paris (FR); Luca Muscariello, Paris (FR); Giovanna Carofiglio, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/686,612

(22) Filed: Mar. 4, 2022

(51) Int. Cl.
  *H04L 9/40* (2022.01)
  *H04L 51/046* (2022.01)
  *H04L 51/06* (2022.01)

(52) U.S. Cl.
  CPC .......... *H04L 63/166* (2013.01); *H04L 51/046* (2013.01); *H04L 51/06* (2013.01); *H04L 63/0442* (2013.01)

(58) Field of Classification Search
  CPC . H04L 63/166; H04L 63/0442; H04L 51/046; H04L 51/06
  USPC ........................................................ 709/223
  See application file for complete search history.

(56) References Cited

U.S. PATENT DOCUMENTS

| | | | |
|---|---|---|---|
| 9,002,921 B2 | 4/2015 | Westphal | |
| 11,044,309 B2 | 6/2021 | Jha et al. | |
| 11,050,724 B2 | 6/2021 | De Gaspari et al. | |
| 2005/0250445 A1* | 11/2005 | Hansson | H04W 40/00 455/466 |
| 2020/0204387 A1 | 6/2020 | Trossen | |
| 2022/0360589 A1* | 11/2022 | Muscariello | H04L 63/065 |

OTHER PUBLICATIONS

Carofiglio, et al., "Enabling ICN in the Internet Protocol Analysis and Evaluation of the Hybrid-ICN Architecture", ICN '19: Conference on Information-Centric Networking, Sep. 24-26, 2019, Macao, China. ACM, New York, NY, USA, 12 pages.
Muscariello, et al., "Hybrid Information-Centric Networking", Internet Draft: draft-muscariello-intarea-hicn-01, Dec. 4, 2018, 22 pages, IETF Trust.
Muscariello, et al., "Hybrid Information-Centric Networking", Internet Draft: draft-muscariello-intarea-hicn-04, May 20, 2020, 22 pages, IETF Trust.

(Continued)

*Primary Examiner* — James E Springer

(74) *Attorney, Agent, or Firm* — Behmke Innovation Group LLC; James M. Behmke; Jonathon P. Western

(57) ABSTRACT

In one embodiment, a delivery service provided by a device receives one or more Messaging Layer Security commit messages comprising a plurality of public and private keys for a Messaging Layer Security group. The delivery service identifies subsets of the plurality of public and private keys to be sent to different destination subgroups in the Messaging Layer Security group. The delivery service maps each of the subsets to Hybrid Information-Centric Networking names. The delivery service sends, based on the Hybrid Information-Centric Networking names, the subsets of the plurality of public and private keys to destination subgroups in the Messaging Layer Security group.

20 Claims, 8 Drawing Sheets

(56) References Cited

OTHER PUBLICATIONS

Barnes, et al., "The Messaging Layer Security (MLS) Protocol", Network Working Group, Internet draft: draft-ietf-mls-protocol-latest, Feb. 10, 2022, 96 pages, Internet Engineering Task Force (IETF).

Beurdouche, et al., "The Messaging Layer Security (MLS) Architecture", Network Working Group, Internet-Draft: draft-ietf-mls-architecture-latest, Oct. 4, 2021, 32 pages, IETF Trust.

* cited by examiner

MESSAGING LAYER SECURITY (MLS) DELIVERY SERVICE FOR REAL-TIME GROUP CONFIDENTIALITY USING HYBRID INFORMATION-CENTRIC NETWORKING (HICN)

TECHNICAL FIELD

The present disclosure relates generally to computer networks, and, more particularly, a Messaging Layer Security (MLS) delivery service for real-time group confidentiality using Hybrid Information-Centric Networking (hICN).

BACKGROUND

Messaging Layer Security (MLS) is a protocol that defines how to securely provide data confidentiality for a group of members of online applications, for example, for exchanging messages in real-time group communications. MLS includes a number of unique security features, including backward and forward secrecy (among members). Compared to other group key agreement protocols, MLS additionally provides, dynamic management of group membership of even group members that are "offline" (e.g., not actively connected to a network). Security features and/or properties generally come at a cost, in terms of time, network resources, etc., in management of group membership operations, for example, when adding/removing members or updating membership. These operations are applied in MLS groups via commit messages that, according to the protocol, must be delivered to all members in a group.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
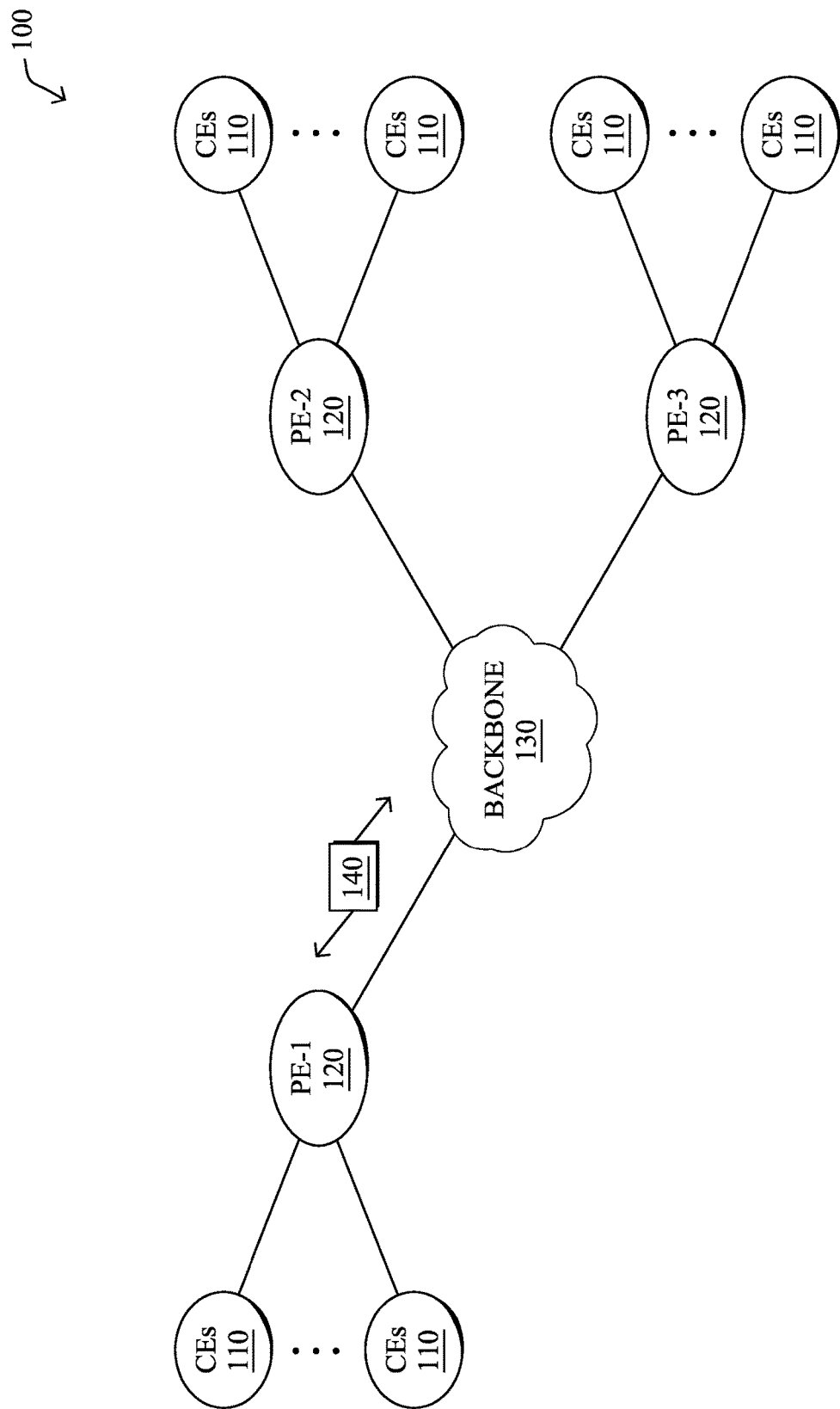
FIGS. 1A-1B illustrate an example communication network.

According to one or more embodiments of the disclosure, a delivery service provided by a device receives one or more Messaging Layer Security commit messages comprising a plurality of public and private keys for a Messaging Layer Security group. The delivery service identifies subsets of the plurality of public and private keys to be sent to different destination subgroups in the Messaging Layer Security group. The delivery service maps each of the subsets to Hybrid Information-Centric Networking names. The delivery service sends, based on the Hybrid Information-Centric Networking names, the subsets of the plurality of public and private keys to destination subgroups in the Messaging Layer Security group.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
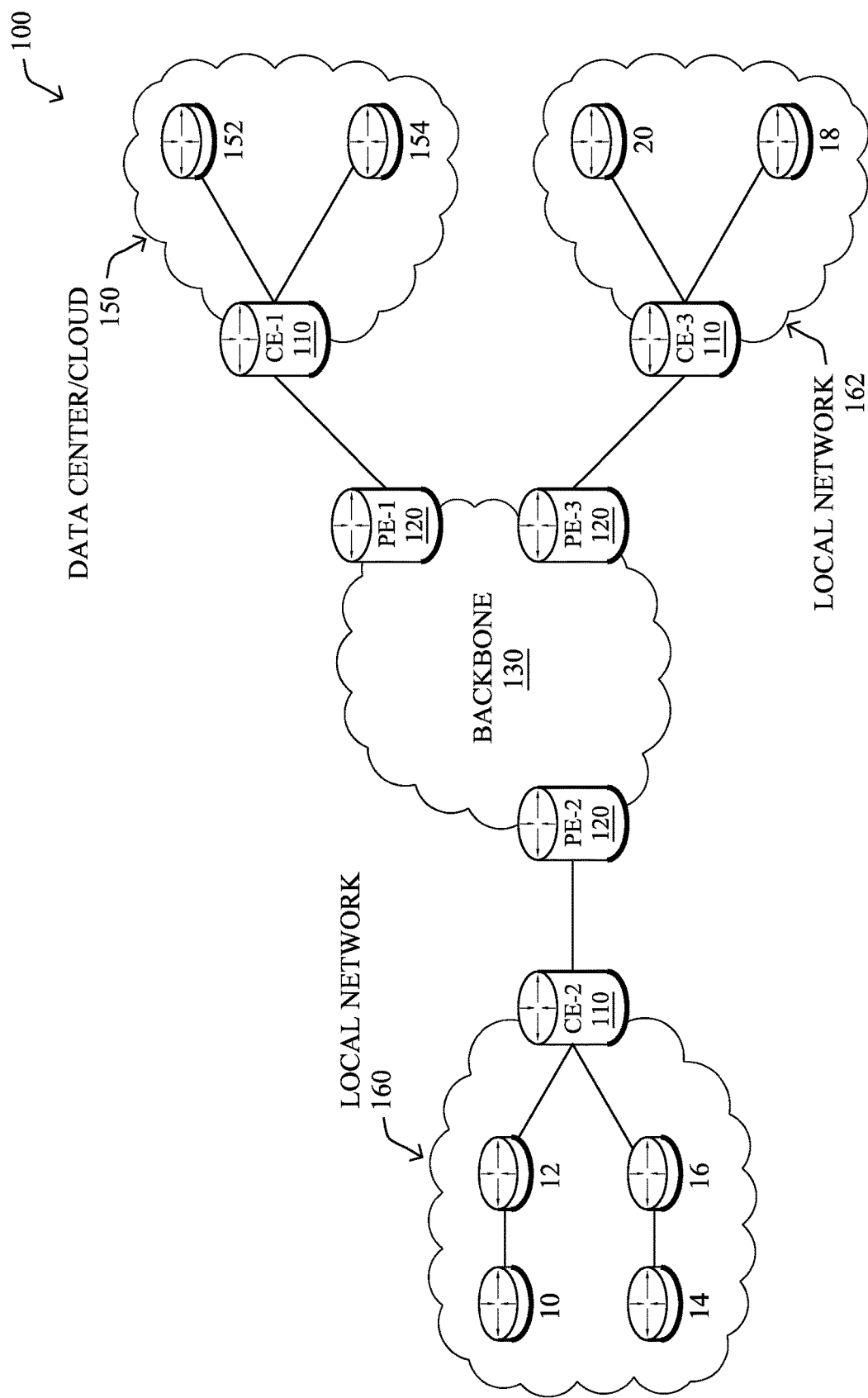

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
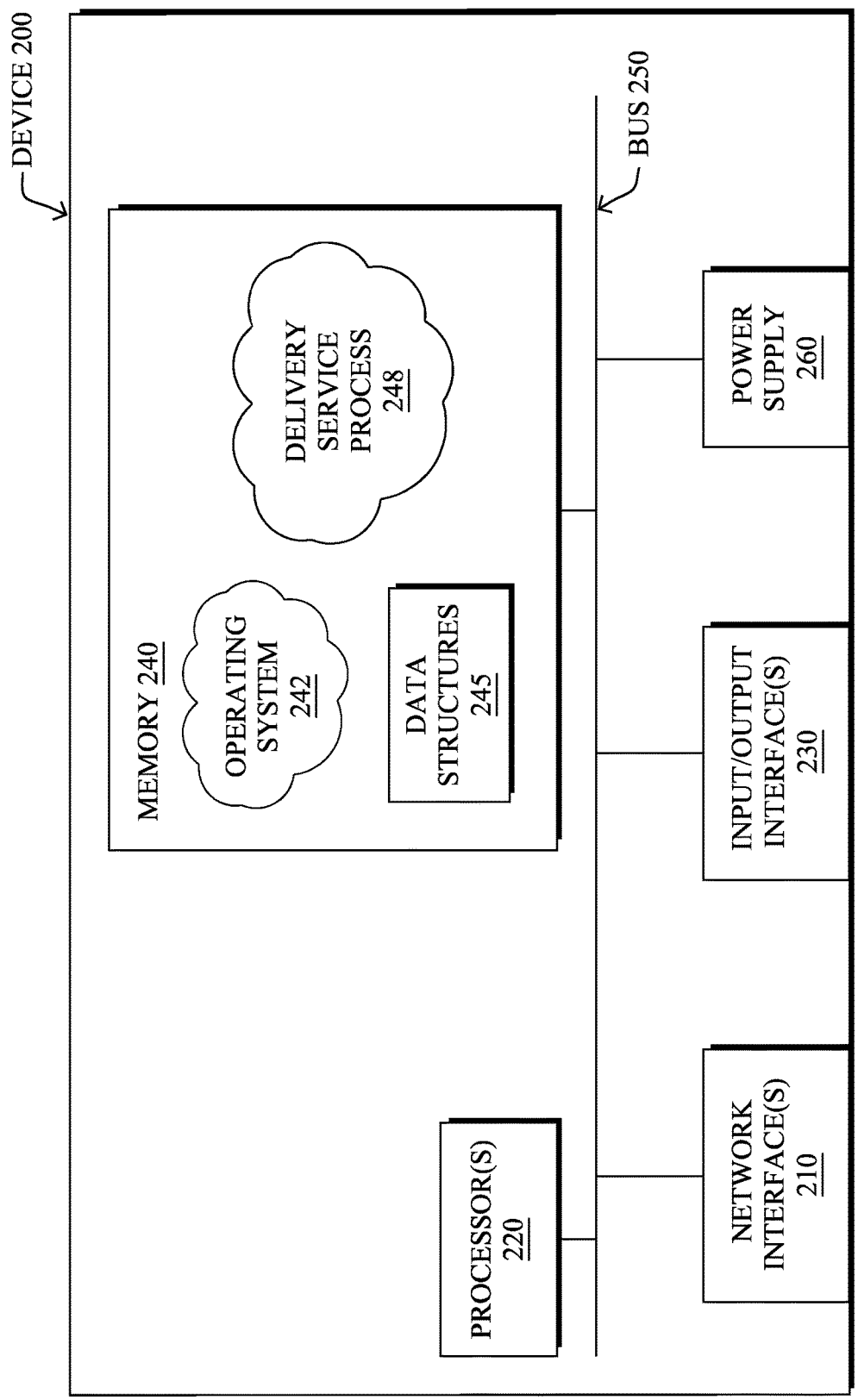
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, physical network interfaces 210 may also be used to implement one or more virtual network interfaces, such as for virtual private network (VPN) access, known to those skilled in the art. As is understood in the art, network interfaces 210 may comprise a plurality of network interfaces used for a variety of networking communication protocols, for example, Wi-Fi, cellular (LTE, 5G, etc.), Bluetooth, etc.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise delivery service process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, Messaging Layer Security (MLS) is a group key agreement protocol that defines how to securely provide data confidentiality for a group of members of online applications, for example, for exchanging messages in real-time group communications. MLS includes a number of unique security features, including backward and forward secrecy (among members). Compared to other group key agreement protocols, MLS additionally provides, dynamic management of group membership of even group members that are "offline" (e.g., not actively connected to a network). Security features and/or properties generally come at a cost, in terms of time, network resources, etc., in management of group membership operations, for example, when adding/removing members or updating membership. These operations are applied in MLS groups via commit messages that, according to the protocol, must be delivered to all members in a group.

The complexity of MLS group management (i.e., costs in terms of space, time, communications, etc.) depends on several factors, in particular, on the ability of the protocol to maintain a well-balanced load across group members. Generally, the load may be defined in terms of computational resources, memory space, and network communications resources that are required to maintain an MLS group's status. The load, then, is directly linked to the underlying data structure that governs MLS group: binary trees where members are represented as leaves. Accordingly, a well-balanced tree may result in fair, well-balanced load across all group members of an MLS group. From a security point of view, load balanced fairness also provides more reliable group maintenance with respect to dynamic group updates. Additionally, well-balanced load allows the system to scale better.

A delivery service that is "semi-trusted" may be implemented in relation to an MLS group to assist in minimizing as well as improving dynamic group management reliability. In particular, "semi-trusted" may generally be defined by an MLS group requirement, rule, etc. that requires a delivery service to deliver various message types within the MLS group. A delivery service, then, may be beneficial for group creation or management (e.g., using commit messages) and for message exchanging (e.g., transmitting of encrypted application messages). Because MLS group members generally comprise devices that are limited in network communication resources (bandwidth, latency, etc.), delivery services are oftentimes are implemented in a location upstream from the MLS group members. In this orientation, however, delivery services become sensitive to or necessarily affected by bottlenecks that may arise throughout an MLS group (e.g., a bandwidth bottleneck between or among downstream MLS group members). A "semi-trusted" delivery service, conventionally, is implemented as a unicast service, where it operates by broadcasting full commit messages to members in an MLS group. However, this presents numerous limitations, notably with respect to scalability.

Figure 3A:
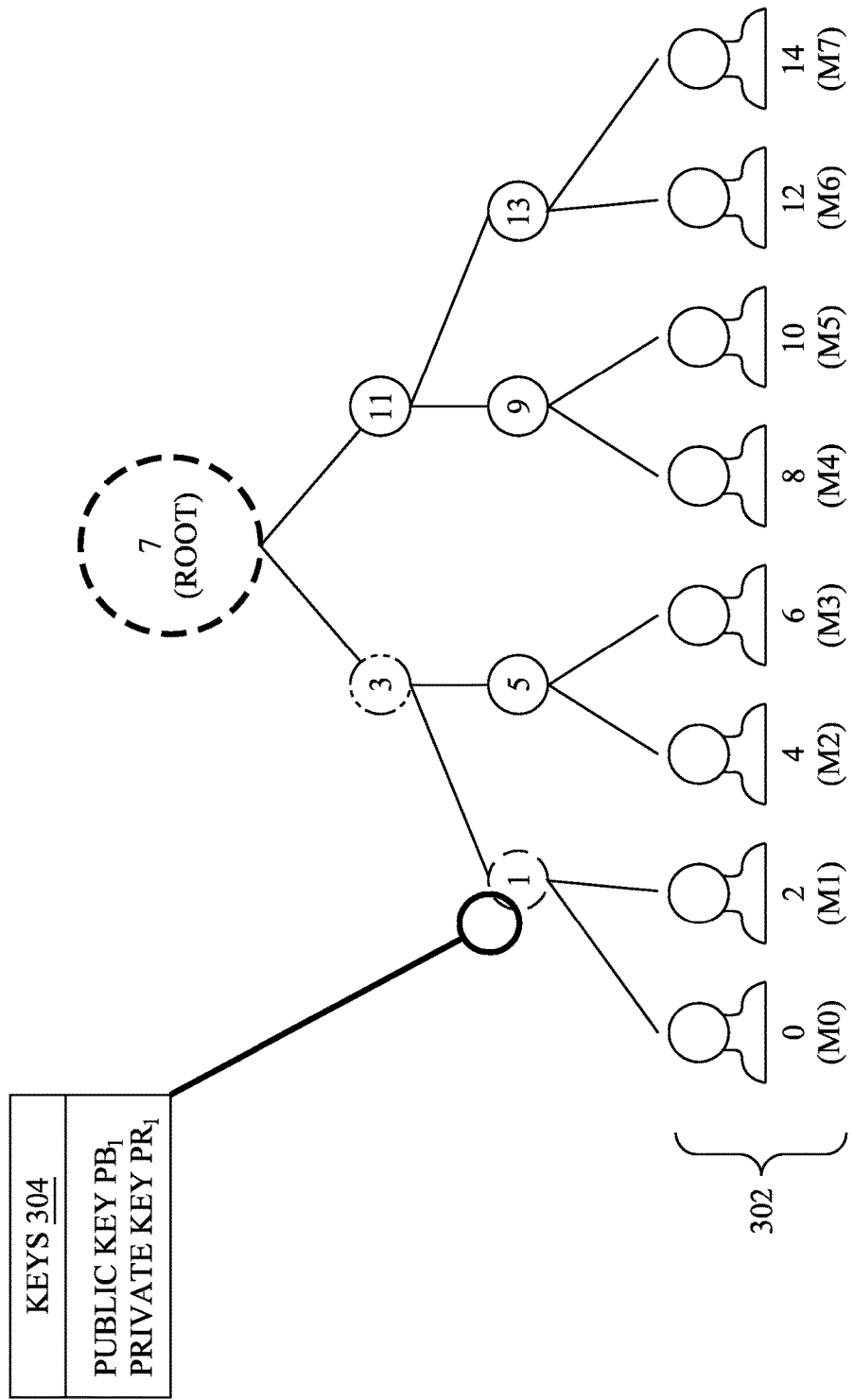
FIGS. 3A-3C illustrate example representations of Messaging Layer Security (MLS) groups that may implement a delivery service.
Figure 3B:
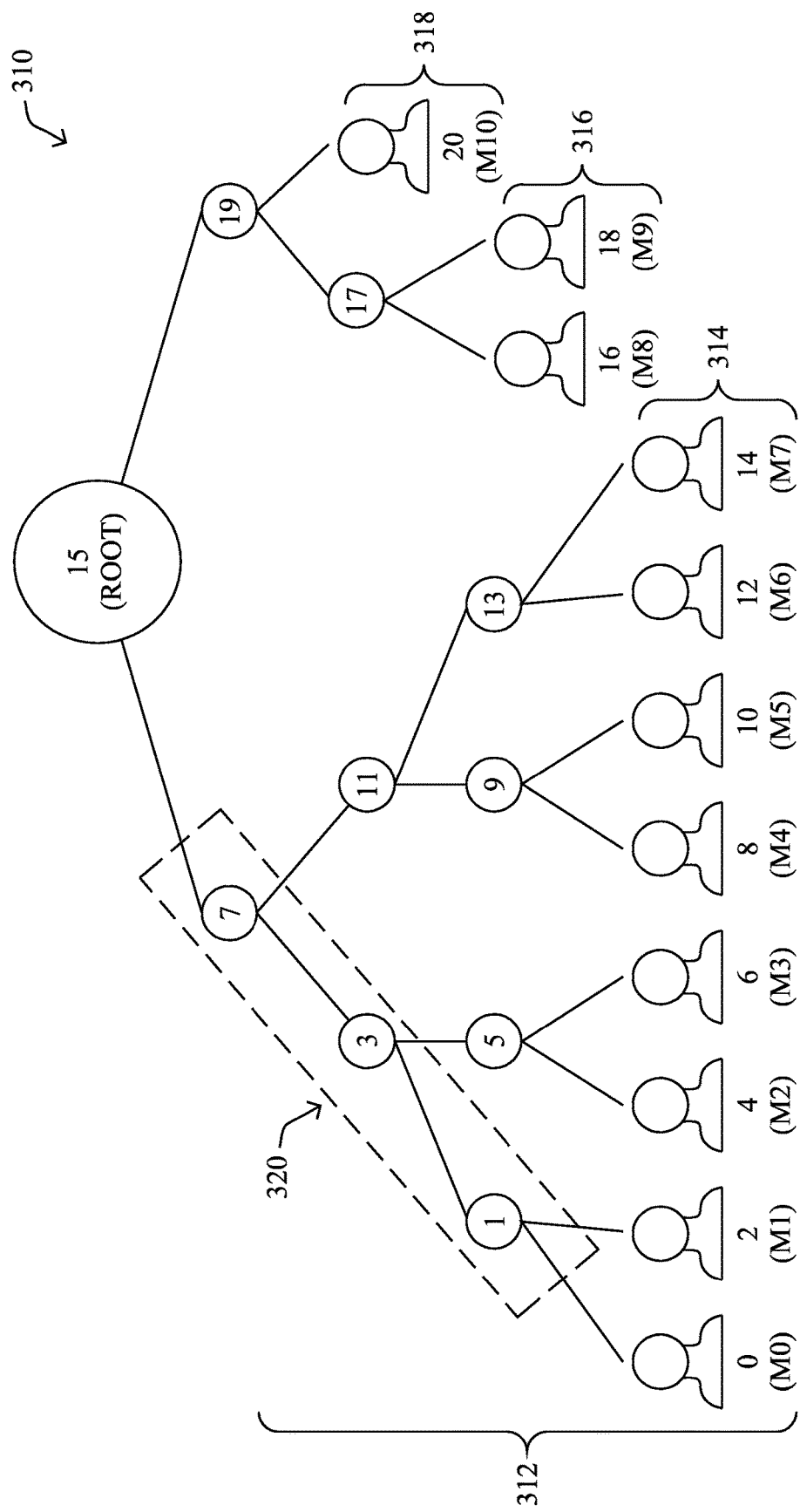
Figure 3C:
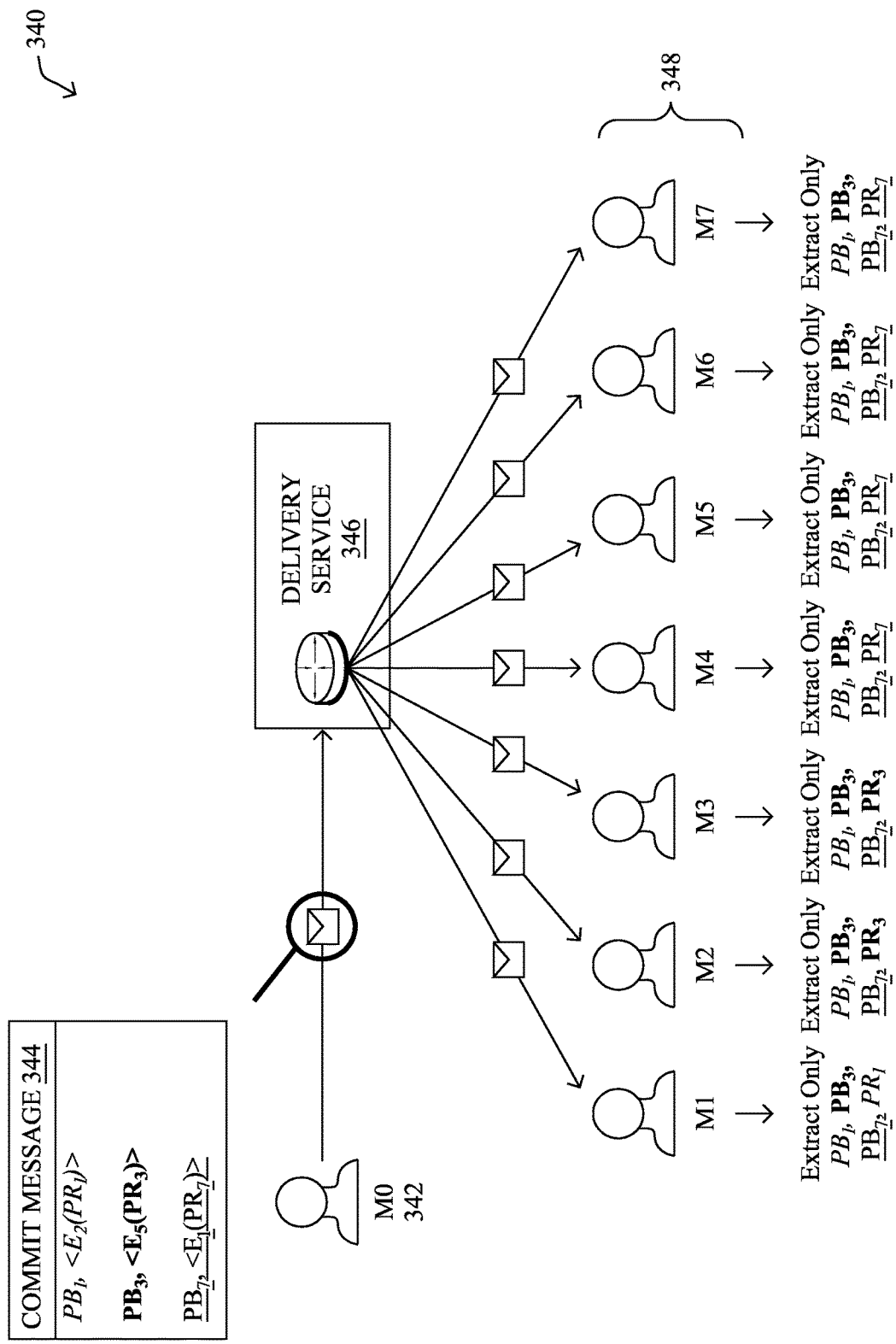

FIGS. 3A-3C illustrate example representations of MLS groups that may implement a delivery service. In particular, FIG. 3A illustrates a tree representation 300 of an MLS group comprising eight group members, and 17 total nodes (including a root node #7). Generally, an MLS group is defined as a left-balanced binary tree, where a binary tree may be considered left-balanced if for every parent, either a parent node is balanced or a left subtree of a parent is the largest full subtree that could be constructed from the leaves present in the parent's own subtree. As shown in FIG. 3A, MLS group members 302 may each be considered leaves of tree representation 300 (e.g., node #0: "M0"; node #2; "M1"; node #4; "M2"; node #6; "M3"; node #8; "M4"; node #10; "M5"; node #12; "M6"; and node #14; "M7"). Further, according to MLS, each non-blank node shown (e.g., node #3, node #5, etc.) in tree representation 300 shares a pair of public-private keys. For example, node #1 in tree representation 300 includes keys 304, Public Key $PB_1$ and Private Key $PR_1$. When an MLS group member is removed from the group of tree representation 300, a leaf it occupies may become blank. As such, costs for a given group member in a binary tree (e.g., a particular leaf node of tree representation 300) is proportional to a node level of a given binary tree. Because each of MLS group members 302 are of a same node level in tree representation 300, costs may be understood as being equally shared among the MLS group members, for example, when membership is being updated or messages are being exchanged. Stated another way, tree representation 300 may be considered a "full" or "perfectly balanced" tree.

Turning to FIG. 3B, tree representation 310 is of an MLS group comprising 11 group members 312, and 20 total nodes (including a root node #15). Group members 312 may each be considered leaves of tree representation 310 (e.g., node #0: "M0"; node #2; "M1"; node #4; "M2"; node #6; "M3"; node #8; "M4"; node #10; "M5"; node #12; "M6"; node #14: "M7"; node #16: "M8"; node #18: "M0"; and node #20; "M10"). As shown, tree representation 310 is left-balanced as defined according to MLS, but it is not "full" (contrasting with tree representation 300 shown with respect to FIG. 3A). That is, different groups of MLS members (depicted as leaf nodes) are of different node levels. Particularly, first subgroup of MLS members 314 is at a lowest depth of tree representation 310, second subgroup of MLS members 316 is a middle (or one level higher) depth of tree representation 310, and third subgroup of MLS members 318 is even one level higher than the middle depth of tree representation 310. Accordingly, first subgroup of MLS members 314 are required to support a higher load (e.g., for MLS group maintenance) than for second subgroup of MLS members 316 or third subgroup of MLS members 318.

When a member from group members 312 wants to change state of the group, for instance, when the members wants to update its associated pair of public keys and private keys to ensure post-compromise secrecy, that member must generate new key pairs for every node in a path from its leaf in to the root of tree representation 310. In an example related to FIG. 3B, if the leaf node #0 associated with a member 0 were to update its key pair, that leaf node would be configured to generate key pairs for node #1, node #3, and node #7 (shown as path 320). In other terms, for a group size N, approximately $\log_2(N)$ new key pairs would be derived. Further, according to MLS and in order to encrypt one or more application messages with a key shared by all members of group members 312, all of the members must share the same view of the tree. Resultingly, this means the public keys of each node must be known to all members. However, it is to be understood that not all private keys must be known by each and every member. Instead, a given member is required to only "have" the private keys of nodes in a path from its leaf to the root of tree representation 310. That is, for example, member M3, indicated by node #5, would need to know the private keys associated with nodes #5, node #3, and node #7 (e.g., private keys $PR_5$, $PR_3$, and $PR_7$). Accordingly, an author group member of a group membership update MLS operation must send a commit message to all other members with the new key pairs. The new key pairs may be sent in cleartext in the commit message, whereas private keys are encrypted using the private keys of an untouched node. For instance, a private key $PR_3$ is encrypted for members M2 (node #4) and M3 (node #6) shown in FIG. 3B using the key $PR_5$. Accordingly, members other than M2 and M3 would not be able to read $PR_3$.

In sum, if an underlying binary tree representing a group has only non-blank nodes, a private key only needs to be encrypted once, particularly from a node to its subtree. In this case of only non-blank nodes, then, there are $\log_2(N)$ number of encryptions to be performed. However, if an underlying binary tree representing a group has one or more blank leaf nodes, a single private key may be encrypted several times for several different members in the subtree. In a worst case scenario, a total number of encryptions needed to cover all members would be approximately O(N).

Turning now to FIG. 3C, example delivery of a commit message is shown. In particular an MLS group 340 may have a group member 342 attempting to send a commit message 344 to delivery service 346, where the commit message is to be broadcasted to members of MLS group 340. As shown, delivery service 346 broadcasting commit message 344 to other members 348 of MLS group 340 may be inefficient as commit message 344 is duplicated N times, once for every member, when it is sent to other members 348. However, as described above herein, other members 348 do not need all the information present in the commit message 344. A particular member will filter out any private keys that it does not use and/or cannot decipher because it is configured to derive only private keys of commit message 344 needed to compute a latest group state. As would be understood by one having ordinary skill in the art, this redundant generation of commit messages as well as computation used to filter out unused/unneeded keys may become increasingly problematic for large MLS groups. For example, given a group of size 1000 with blank leaves with a key size of 256 bytes, a resulting commit message would need to comprise 1000 encrypted keys. In the worst case scenario, this would be a size of at least 256 kB. This message would then be replicated 1000 times on a downlink from delivery service (e.g., delivery service 346), leading to a rapid saturation of a communications network used by an MLS group (e.g., MLS group 340). In the worst case scenario, the downlink network usage could grow in $O(N^2)$. Therefore, it appears that a delivery service broadcasting a commit message in full is not always a "most" optimal approach, as only a subset of a commit message may be needed to be retrieved by group members (e.g., to update cryptographic system status according to MLS and/or to exchange application messages).

Messaging Layer Security (MLS) Delivery Service for Real-time Group Confidentiality Using Hybrid Information-Centric Networking (hICN)

The techniques herein introduce mechanisms for a Messaging Layer Security (MLS) delivery service for real-time group confidentiality Using Hybrid Information-Centric Networking (hICN). A delivery service of an MLS group may be optimized such that "load" (e.g., computational, memory, communications, etc.) across group members may be maintained in a well-balanced fashion. When a member of an MLS group sends a commit message (to update membership of the group), the commit message may be split such that sub-messages contain only the required information for other group members. The delivery service may then direct the sub-messages to the group members. In the delivery of the sub-messages, the delivery service may leverage features of hICN, particularly, encoding in a suffix for message delivery.

Stated another way, resource costs in terms of MLS commit message size to create a group of size N scales like $O(N^2)$ in a worst case scenario as the total number of commit messages exchanged to create a subgroup of size M is O(M) and each commit message has a size that grows linearly in N. Optimal communication costs would scale like $O(N\log_2 N)$ in a worst case scenario, and the techniques described herein, by leveraging features of hICN protocol as a communication service for a delivery service, match or improve upon this.

Specifically, according to one or more embodiments of the disclosure as described in detail below, a delivery service provided by a device receives one or more Messaging Layer Security commit messages comprising a plurality of public and private keys for a Messaging Layer Security group. The delivery service identifies subsets of the plurality of public and private keys to be sent to different destination subgroups in the Messaging Layer Security group. The delivery service maps each of the subsets to Hybrid Information-Centric Networking names. The delivery service sends, based on the Hybrid Information-Centric Networking names, the subsets of the plurality of public and private keys to destination subgroups in the Messaging Layer Security group.

Illustratively, the techniques described herein may be performed by hardware, software, and/or firmware, such as in accordance with delivery service process 248, which may include computer executable instructions executed by the processor 220 (or independent processor of interfaces 210) to perform functions relating to the techniques described herein.

Figure 4:
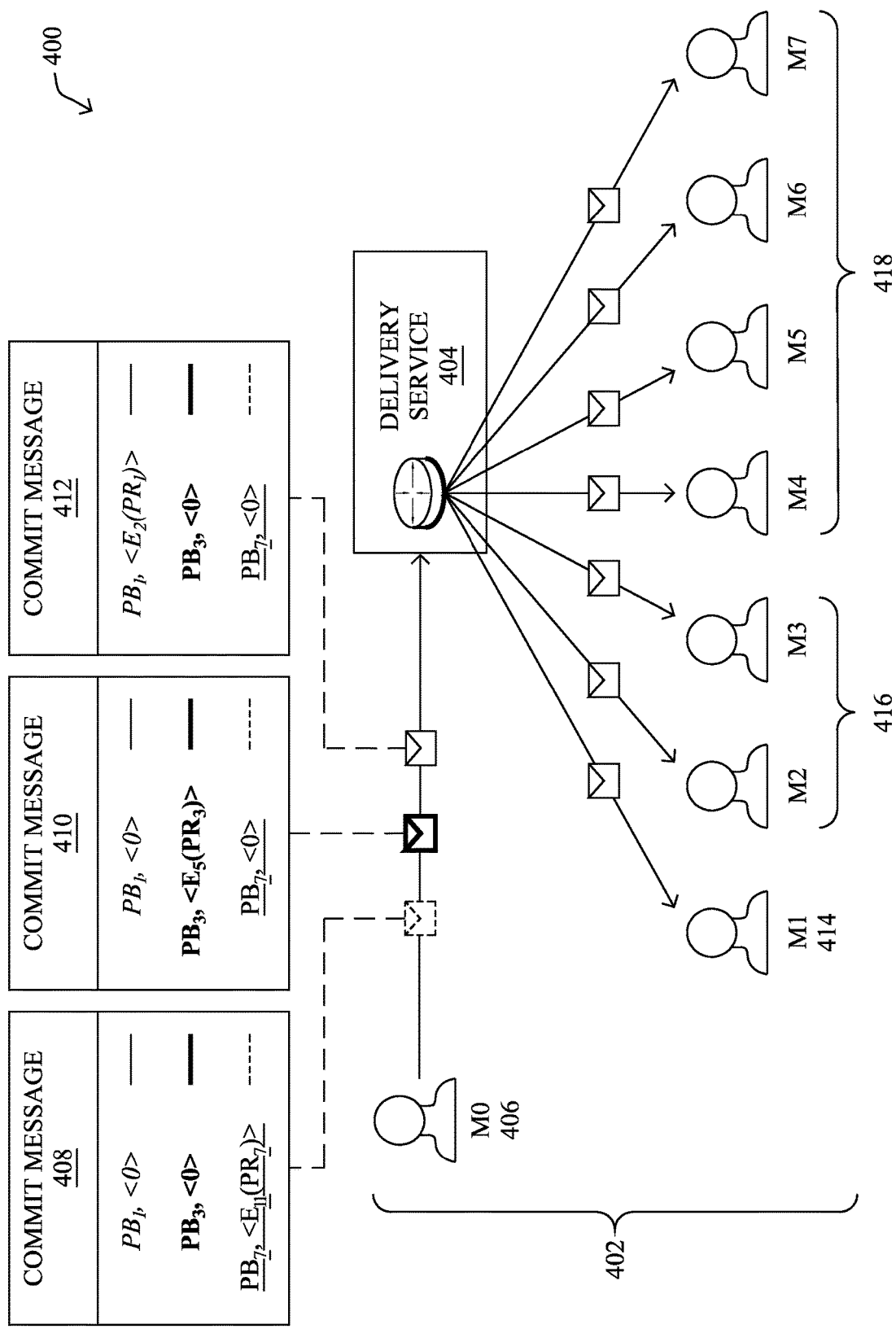
FIG. 4 illustrates an example architecture for an MLS delivery service for real-time group confidentiality using Hybrid Information-Centric Networking (hICN)

Operationally, FIG. 4 illustrates an example architecture for an MLS delivery service for real-time group confidentiality using Hybrid Information-Centric Networking (hICN), where architecture 400 may include a plurality of MLS group members 402 and a delivery service 404, where MLS group members 402 and delivery service 404 may comprise components, hardware, software, etc. that are used to implement or cause delivery service process 248. Delivery service 404 may be configured to use a Hybrid Information-Centric Networking (hICN) based broadcast service that is configured to publish content from one MLS group member to other MLS group members (e.g., a commit message that is used to update group membership or create MLS groups, application messages, etc.). Similarly, MLS group members 402 may be equipped, configured, etc. with one or more hICN transport services, for example, by using one or more application programming interface APIs (e.g., producer-consumer). That is, a producer (e.g., over a communication socket) may be implemented such that it binds a name prefix, where the name prefix may be used to pull data, information, etc. by consumers (e.g., over a communication socket). Generally, an hICN name prefix may be an internet protocol version 6 (IPv6) address number, as defined in hICN. Further, an hICN name prefix is understood to be a location independent name (topic, data identifier, etc.) that hides network topologies details to both consumers and producers (e.g., among MLS group members 402).

Each of MLS group members 402, then, is configured with the ability to pull all public keys associated with a given MLS group and only the private keys that a given MLS group member is able to decrypt. Specifically, this may be enabled by binding one or more tree indexing conventions over 32 bits encoding into a hICN suffix (which is also encoded in 32 bits). As will be understood by one having ordinary skill in the art, a given key identifier (ID) and a hICN suffix value need not have a same value.

With respect to the example illustrated in FIG. 4, a first member 406 of MLS group members 402 may, when it is attempting to update group membership of an MLS group and/or sending an application message, be configured to split a commit message (e.g., generated according to MLS) into sub-messages, shown as first commit message 408, second commit message 410, and third commit message 412, so that each sub-message contains only the required information for respective MLS member of MLS group members 402 (i.e., information that a receiving MLS group member does not use or incapable of deciphering is filtered out). Delivery service 404 may then map each of first commit message 408, second commit message 410, and third commit message 412 to one or more hICN names that members of MLS group members 402 use to retrieve their assigned commit messages (or application messages).

Delivery service 404 creates a logical multicast tree (one per group member originating from delivery service 404) that is used to distribute a minimum set of messages that are required to complete an operation according to the MLS protocol (e.g., MLS agreement). In the example shown in FIG. 4, delivery service 404 makes third commit message 412 (and the keys included therein) available to a first subset 414 of group members e.g., M1); second commit message 410 (and the keys included therein) available to a second subset 416 of MLS group members 402 (e.g., M2 and M3); and first commit message 408 (and the keys included therein) available to third subset 418 of MLS group members 402 (M4, M5, M6, and M7).

Notably, optimal configurations (e.g., Pareto) of MLS group members 402 may be determined when a load reduction for a group member would imply load increase for another group member. In tree based group key agreement protocols like MLS, optimality depends on the structure of the logical tree that is used to generate encryption keys. As long as the logical tree is balanced and full, the closer an entire system will be to optimality. Maintaining balance of a tree is important as the cost to make a tree balanced is as expensive (in terms of resource costs, time, etc.) as recreating the tree from the beginning, for example, $O(N\log_2 N)$. The techniques described herein implement features of hICN to simplify creation and the management of the tree by providing one or more communication channels that simplify the optimization of message exchanges for MLS group members 302, particularly, via hiding complexity of tree topology to group members.

Because each of first commit message 408, second commit message 410, and third commit message 412 are of smaller size than a commit message (e.g., described with respect to FIG. 3C), downlink bandwidth from delivery service 404 to group members that pull commit messages is minimized. In an example, with 1000 clients the size of a sub-message is in $O(\log_2 N)$ due to the mandatory inclusion of all public keys in each message. This message may be downloaded N times per member from delivery service 404, so downlink complexity is generally around $O(\log_2 N)$. Further, uplink bandwidth may be more solicited than described above with the example illustrated in FIG. 3C; that is, an original commit message may be split into N sub-messages at most (e.g., one for every private key present in the original commit). Therefore, a total of N sub-messages may be considered a worst case scenario. In addition, each sub-message must contain set of public keys, as described above, which totals $\log_2 N$ keys. A total number of bytes sent upstream from a given member to delivery service 404 is therefore $O(\log_2 N)$ at worst, as compared to $O(N)$ in the example where a commit message is not broken into subsets. This, however, allows delivery service 404 to achieve better or more complete fairness in terms of computations. Stated another way, uplink bandwidth (towards delivery service 404) is resultingly solicited as much downlink bandwidth (from delivery service 404), as compared to the example of FIG. 3C where delivery service 346 would receive $O(N)$ bytes compared to sending $O(N^2)$ (in worst case scenario).

Figure 5:
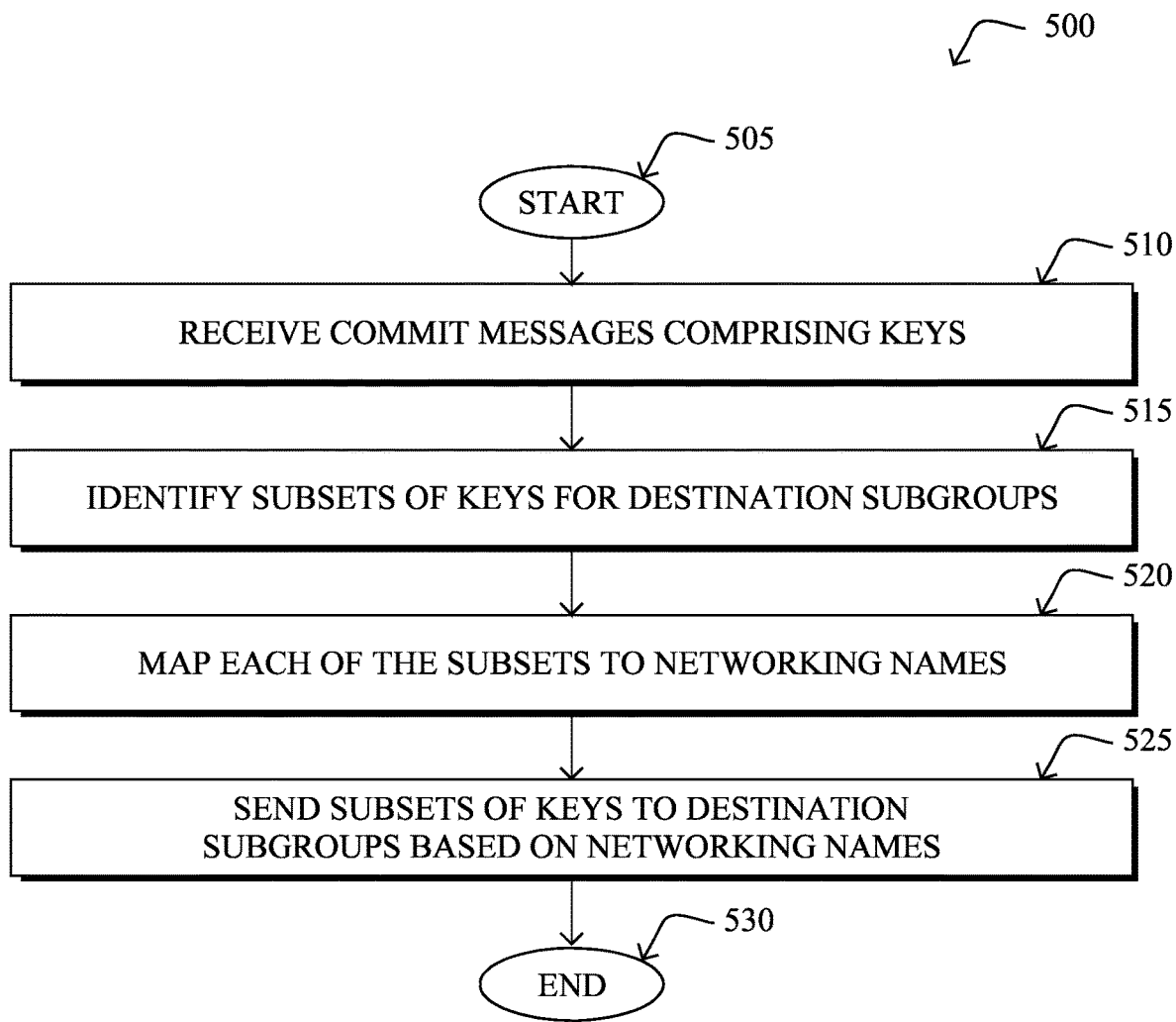
FIG. 5 illustrates an example simplified procedure for an MLS delivery service for real-time group confidentiality using hICN.

FIG. 5 illustrates an example simplified procedure (e.g., a method) for an MLS delivery service for real-time group confidentiality using hICN, in accordance with one or more embodiments described herein. For example, a non-generic, specifically configured device (e.g., device 200), may perform procedure 500 by executing stored instructions (e.g., delivery service process 248). The procedure 500 may start at step 505, and continues to step 510, where, as described in greater detail above, a delivery service provided by a device may receive one or more Messaging Layer Security commit messages comprising a plurality of public and private keys for a Messaging Layer Security group. In an embodiment, the one or more Messaging Layer Security commit messages may comprise group membership or application information.

At step 515, as detailed above, the delivery service may identify subsets of the plurality of public and private keys to be sent to different destination subgroups in the Messaging Layer Security group. In an embodiment, the subsets of the plurality of public and private keys may be created by a member node of the Messaging Layer Security group. In one or more embodiments, the subsets of the plurality of public and private keys may be created at the delivery service.

At step 520, the delivery service may map each of the subsets to Hybrid Information-Centric Networking names. In an embodiment, mapping each of the subsets to the Hybrid Information-Centric Networking names may be based on binding, by the delivery service, one or more tree conventions into Hybrid Information-Centric Networking suffixes. In a further embodiment, the one or more tree conventions may require that a binary tree associated with the Messaging Layer Security group is balanced and full. In one or more embodiments, the one or more tree conventions may be according to a Pareto configuration.

At step 525, as detailed above, the delivery service may send, based on the Hybrid Information-Centric Networking names, the subsets of the plurality of public and private keys to destination subgroups in the Messaging Layer Security group. In an embodiment, a network topology of the Messaging Layer Security group may be hidden from the Messaging Layer Security group. In one or more embodiments, downlink complexity from the delivery service to the destination subgroups in the Messaging Layer Security group may be generally around $O(\log_2 N)$. In a further embodiment, downlink complexity from the delivery service to the destination subgroups in the Messaging Layer Security group may be approximately equal to uplink complexity from the destination subgroups in the Messaging Layer Security group to the delivery service. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism an MLS delivery service for real-time group confidentiality using hICN. That is, a delivery service of an MLS group may be optimized such that "load" (e.g., computational, memory, communications, etc.) across group members may be maintained in a well-balanced fashion. When a member of an MLS group sends a commit message (to update membership of the group), the commit message may be split such that sub-messages contain only the required information for other group members. The delivery service may then direct the sub-messages to the group members. In the delivery of the sub-messages, the delivery service may leverage features of hICN, so as to optimize both downlink complexity (from the delivery service to group members) as well as uplink complexity (from group members to the delivery service).

While there have been shown and described illustrative embodiments that provide an MLS delivery service for real-time group confidentiality using hICN, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of network packets, protocols, etc. are discussed herein, the techniques herein may be used in conjunction with any network packets, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a delivery service provided by a device, one or more Messaging Layer Security commit messages comprising a plurality of public and private keys for a Messaging Layer Security group;
    identifying, by the delivery service, subsets of the plurality of public and private keys to be sent to different destination subgroups in the Messaging Layer Security group;
    mapping, by the delivery service, each of the subsets to Hybrid Information-Centric Networking names; and
    sending, by the delivery service and based on the Hybrid Information-Centric Networking names, the subsets of the plurality of public and private keys to destination subgroups in the Messaging Layer Security group.

2. The method as in claim 1, wherein the subsets of the plurality of public and private keys are created by a member node of the Messaging Layer Security group.

3. The method as in claim 1, wherein the subsets of the plurality of public and private keys are created at the delivery service.

4. The method as in claim 1, wherein mapping, by the delivery service, each of the subsets to the Hybrid Information-Centric Networking names is based on binding, by the delivery service, one or more tree conventions into Hybrid Information-Centric Networking suffixes.

5. The method as in claim 4, wherein the one or more tree conventions require that a binary tree associated with the Messaging Layer Security group is balanced and full.

6. The method as in claim 4, wherein the one or more tree conventions is according to a Pareto configuration.

7. The method as in claim 1, wherein a network topology of the Messaging Layer Security group is hidden from the Messaging Layer Security group.

8. The method as in claim 1, wherein downlink complexity from the delivery service to the destination subgroups in the Messaging Layer Security group is generally around $O(\log_2 N)$.

9. The method as in claim 1, wherein downlink complexity from the delivery service to the destination subgroups in the Messaging Layer Security group is approximately equal to uplink complexity from the destination subgroups in the Messaging Layer Security group to the delivery service.

10. The method as in claim 1, wherein the one or more Messaging Layer Security commit messages comprise group membership or application information.

11. An apparatus, comprising:
    one or more interfaces;
    a processor coupled to the one or more interfaces and configured to execute one or more processes; and
    a memory configured to store a process that is executable by the processor, the process, when executed, configured to cause a delivery service to:
        receive one or more Messaging Layer Security commit messages comprising a plurality of public and private keys for a Messaging Layer Security group;
        identify subsets of the plurality of public and private keys to be sent to different destination subgroups in the Messaging Layer Security group;

map each of the subsets to Hybrid Information-Centric Networking names; and send, based on the Hybrid Information-Centric Networking names, the subsets of the plurality of public and private keys to destination subgroups in the Messaging Layer Security group.

12. The apparatus as in claim 11, wherein the subsets of the plurality of public and private keys are created by a member node of the Messaging Layer Security group.

13. The apparatus as in claim 11, wherein the subsets of the plurality of public and private keys are created at the delivery service.

14. The apparatus as in claim 11, wherein mapping, by the delivery service, each of the subsets to the Hybrid Information-Centric Networking names is based on binding, by the delivery service, one or more tree conventions into Hybrid Information-Centric Networking suffixes.

15. The apparatus as in claim 14, wherein the one or more tree conventions require that a binary tree associated with the Messaging Layer Security group is balanced and full.

16. The apparatus as in claim 14, wherein the one or more tree conventions is according to a Pareto configuration.

17. The apparatus as in claim 11, wherein a network topology of the Messaging Layer Security group is hidden from the Messaging Layer Security group.

18. The apparatus as in claim 11, wherein downlink complexity from the delivery service to the destination subgroups in the Messaging Layer Security group is generally around $O(\log_2 N)$.

19. The apparatus as in claim 11, wherein downlink complexity from the delivery service to the destination subgroups in the Messaging Layer Security group is approximately equal to uplink complexity from the destination subgroups in the Messaging Layer Security group to the delivery service.

20. A tangible, non-transitory, computer-readable medium storing program instructions that cause a delivery service provided by a device to execute a process comprising:

receiving, at the delivery service, one or more Messaging Layer Security commit messages comprising a plurality of public and private keys for a Messaging Layer Security group;

identifying subsets of the plurality of public and private keys to be sent to different destination subgroups in the Messaging Layer Security group;

mapping each of the subsets to Hybrid Information-Centric Networking names; and sending, based on the Hybrid Information-Centric Networking names, the subsets of the plurality of public and private keys to destination subgroups in the Messaging Layer Security group.

* * * * *